United States Patent [19]
Gran et al.

[11] Patent Number: 6,029,959
[45] Date of Patent: Feb. 29, 2000

[54] SEMI-ACTIVE VIBRATION ISOLATOR AND FINE POSITIONING MOUNT

[75] Inventors: Milton H. Gran, Fullerton; Allen J. Bronowicki, Laguna Niguel, both of Calif.

[73] Assignee: TRW Inc., Redondo Beach, Calif.

[21] Appl. No.: 09/226,948

[22] Filed: Jan. 8, 1999

Related U.S. Application Data

[63] Continuation of application No. 08/721,809, Sep. 27, 1996.

[51] Int. Cl.[7] .................................................. F16M 1/00
[52] U.S. Cl. .......................................... 267/136; 188/378
[58] Field of Search ............................... 267/136, 140.14; 188/378, 379, 380; 248/550, 556, 562, 636, 638; 244/164, 171

[56] References Cited

U.S. PATENT DOCUMENTS

| | | | |
|---|---|---|---|
| 3,251,591 | 5/1966 | McNally | 267/221 |
| 3,566,993 | 3/1971 | Leatherwood | 188/379 |
| 3,690,607 | 9/1972 | Mard | 248/550 |
| 4,848,525 | 7/1989 | Jacot et al. | 267/136 X |
| 5,251,863 | 10/1993 | Gossman et al. | 248/550 |
| 5,305,981 | 4/1994 | Cunningham et al. | 248/550 |
| 5,333,819 | 8/1994 | Stetson, Jr. | 244/164 |

*Primary Examiner*—Robert J. Oberleitner
*Assistant Examiner*—Pamela J. Lipka
*Attorney, Agent, or Firm*—Michael S. Yatsko

[57] ABSTRACT

A vibration isolation and precision pointing device, and a related method for its operation, for reducing vibrational disturbances on a payload platform, which is subject to vibration transmitted from a base platform and to other possible vibrational disturbances applied directly to the payload itself or to the payload platform. The invention includes a complementary combination of passive isolation and active isolation in parallel between the base and payload platforms, together with a precision positioning system that greatly reduces vibration at very low frequencies. Each isolation device, of which there are three pairs arranged to damp vibration in three axes, includes, in one embodiment, a passive spring to reduce coupling of vibration at higher frequencies and to fulfill a static load bearing function, and an active actuator element, in the form of a voice coil actuator, for applying active compensation over a selected bandwidth of frequencies below that over which passive isolation is most effective. Another disclosed form of each isolation device includes an elastic tube bendable by piezoelectric actuators and having a flexure that transmits the bending force to the payload platform along a single selected axis. In one preferred embodiment of the invention, three pairs of isolation devices are arranged on mutually orthogonal planes that intersect at the center of mass of the payload. As a result, translational vibration in the orthogonal planes is decoupled from rotation of the payload.

12 Claims, 7 Drawing Sheets

SEMI-ACTIVE VIBRATION ISOLATOR AND FINE POSITIONING MOUNT

This application is a continuation of copending application Ser. No. 08/721,809 filed on Sep. 27, 1996.

BACKGROUND OF THE INVENTION

This invention relates generally to mechanisms for vibration isolation and, more particularly, to structures that allow fine pointing to be commanded to optics while simultaneously isolating the optics from any vibration that is present in a base platform on which optics or other precision equipment is to be mounted. The need for this type of vibration isolation arises in numerous applications. Some of these applications involve equipment installed on the ground, and others involve equipment installed on ships, aircraft or spacecraft. A typical application is the mounting of a telescope or other precise optical sensor such as an interferometer. The optical instrument as a whole must be pointed precisely in a desired direction. The optics must also be isolated from moderate to high frequency base motions, which, if transmitted, could distort the relative positions of the optical elements, thus causing aberrations such as wavefront error or defocusing.

Another application of the invention is the isolation of precision manufacturing equipment from base motion over a wide frequency range, such as 0.01 Hz to 1,000 Hz. Isolation from extremely low vibration levels is required, for example, in the fabrication of semiconductor wafers on the ground, and for microgravity crystal growth experiments in space.

It is well known that passive vibration devices, such as springs with passive damping devices acting in parallel, cannot always provide satisfactory isolation at low frequencies, such as below 5 Hz. Another difficulty with passive isolators is that they have a natural sag in the presence of gravitational forces. For a passive isolator having a natural frequency $f_0$, the static vertical sag is given by the formula $\Delta = g/2\theta_0)^2$, where g is the acceleration due to gravity. For a 10 Hz passive isolator, the sag is approximately $\Delta = 2.5$ mm, and it is feasible to build springs with sufficient stroke, linearity and strength to support the weight of the payload. However, at lower isolation frequencies, such as approximately 1 Hz, the static sag in the isolator mount under gravity loads will be 100 times as great, i.e. $\Delta = 25$ cm. This presents a difficult mechanical design problem, which is sometimes solved through the addition of complicated and bulky pneumatic gravity offload systems.

Conventional six degree of freedom kinematic mounting configurations, sometimes known as "Stewart platforms," do not, in general, provide decoupling between translational and rotational motions of the base. In other words, the centers of force of the conventional Stewart platform are such that, should the base be translated laterally with respect to the payload, tipping moments, in addition to lateral forces, can be applied to the payload, with a resultant tendency toward pointing errors. The coupling between translational and rotational motion in the conventional kinematic mount also means that isolation frequencies for the three translational motions cannot be specified completely independently of the isolation frequencies for the three rotational motions. Thus, since practical considerations make it difficult to achieve a low isolation frequency for translational motions, the coupling between translation and rotation in conventional kinematic mounts also precludes the implementation of a low isolation frequency for rotational motions.

Another type of known isolation mechanism uses active rather than passive devices. Included in this general type is any device that senses deflection or acceleration of a platform to be isolated, and applies a force or commands a displacement to compensate for the sensed acceleration or deflection. Various types of deflection sensors and actuators, such as piezoelectric transducers, are well known, as are acceleration sensors and force actuators, such as magnetic voice coil motors. Active vibration isolation over a broad bandwidth of frequencies using this fully active compensation approach will, in general, require a control system with great accuracy, high gain and considerable speed. Moreover, such fully active isolation requires a relatively high power consumption. Consequently, there have been attempts to combine the simplicity of passive isolation at higher frequencies with active vibration and position control at lower frequencies, to obtain isolation and accurate positioning over a broad bandwidth. Such combinations, prior to the present invention, have not been successful.

SUMMARY OF THE INVENTION

The present invention resides in a semi-active isolator that combines passive isolation with active damping and positioning in a parallel configuration. Briefly, and in general terms, the vibration isolation and positioning mount of the invention comprises a combination of semi-active isolator elements in a particular mounting configuration designed to achieve the vibration control and positioning objectives. An individual semi-active isolator element consists of a passive isolator element, an active force actuation element in parallel with the passive isolation element, a local vibration sensor, either of force, displacement, velocity or displacement, and a local vibration control circuit. The semi-active isolator elements are connected in parallel between a first base platform and a second payload platform, which is to be isolated from vibratory motions in the first platform, and positioned with respect to inertial space. To provide global positioning of the second platform, signals from a set of inertial sensors are connected to a global positioning controller, which generates commands to the force actuators so that the desired global positioning can be achieved.

The passive portion of an isolator element attenuates transmission of vibratory motions at frequencies above those of the fundamental isolation modes, while the active portion compensates for vibratory disturbances over a selected frequency band, complementing the effect of the passive isolator element. To accomplish this, the local vibration control circuit acts to feed back signals from the local vibration sensor to the force actuator such as to damp vibrations in the fundamental isolation modes, as well as to actively attenuate vibration transmission in a frequency band above and below the fundamental isolation mode. For instance, if a piezoelectric force transducer is placed in series with the passive element and force actuator, then one can feed back a signal proportional to transmitted force, and, using an appropriate feedback compensation network, actively attenuate this transmitted force while damping the fundamental isolator modes.

In one particular embodiment of the invention the passive isolator element is a linear spring and the force actuator is a magnetic voice coil motor. In a second embodiment the passive isolator element is a flexure beam and the force actuator is a set of piezoelectrics conforming to the beam's surface, such that compliance and applied force in a single direction normal to the axis of the beam is achieved. In a variation of the second embodiment, the flexure beam is constructed with compliance in both directions normal to the axis of the beam, and separate sets of piezoelectrics are employed on orthogonal faces of the beam such that force can be applied separately in both directions normal to the beam axis.

To achieve precise positioning of the payload with respect to inertial space requires a set of inertial measurements on the payload, which one can combine and compensate in order to generate commands to the six force actuators, thus directing the payload toward its desired position. For inertial stabilization of payloads in which low vibration levels are desired, for instance wafer fabrication or crystal growth, the inertial sensors would be accelerometers or inertial velocity transducers, e.g. geophones. For stabilization of optics in which accurate pointing at a particular target is desired, an attitude reference system is required, typically containing rate gyroscopes, optical reference sensors (e.g. star trackers or signals from the optical system being pointed) and possibly processing algorithms such as a Kalman filter. Attitude errors determined by the attitude reference system are processed through a multi-input, multi-output control algorithm to determine commands to the six force actuators, so that the desired pointing can be achieved within a degree of precision determined by the intrinsic limitations of the hardware and software.

A unique variant of the invention allows one to achieve decoupling between translational and rotational motions in the isolation system, while allowing for independent specification of the global isolation frequency in each of the three rotational modes as well as two or more of the three translational modes, dependent upon the particular configuration implemented. In this configuration, six semi-active isolation elements are disposed in pairs between the first and second platforms. More specifically, the lines of action of the isolator elements in a pair act in parallel lines directed to either side of the center of mass of the payload platform, such that these lines of action define a plane which passes through the payload center of mass. The three planes defined by the three pairs of isolator elements are mutually orthogonal, such that together they define one corner of a cube with a vertex at the payload mass center.

It will be appreciated from the foregoing that the present invention represents a significant advance in vibration isolation structures. In particular, the invention provides a complementary combination of passive isolation, active damping and fine positioning control. The fine positioning control also achieves vibration isolation at very low frequencies, below those that can addressed by conventional active or passive vibration isolation techniques. The invention also effectively decouples translational vibration from possible rotational effects on the payload. Other aspects and advantages of the invention will become apparent from the following more detailed description, taken in conjunction with the accompanying drawings.

DESCRIPTION OF THE PREFERRED EMBODIMENTS

As shown in the drawings for purposes of illustration, the present invention pertains to a device using a combination of passive isolation and active damping to provide vibration isolation and allow fine pointing control in the presence of vibration over a wide frequency bandwidth. Prior to this invention, there has been no completely satisfactory technique to isolate precision equipment effectively from vibration and to provide fine pointing control of the equipment. Various combinations of passive and active damping structures have all fallen short in providing effective isolation and fine pointing control. A critical shortcoming of previously available vibration isolator systems is their inability to prevent coupling of translational vibration into unwanted rotational movements that prevent accurate pointing control.

In accordance with the present invention, multiple semi-active isolator elements, each combining passive isolation and active damping, are combined in a configuration that achieves both the vibration control and the positioning or pointing objectives. Moreover, these objectives are achieved in such a manner that coupling between translational and rotational movements is minimized or eliminated.

Figure 1:
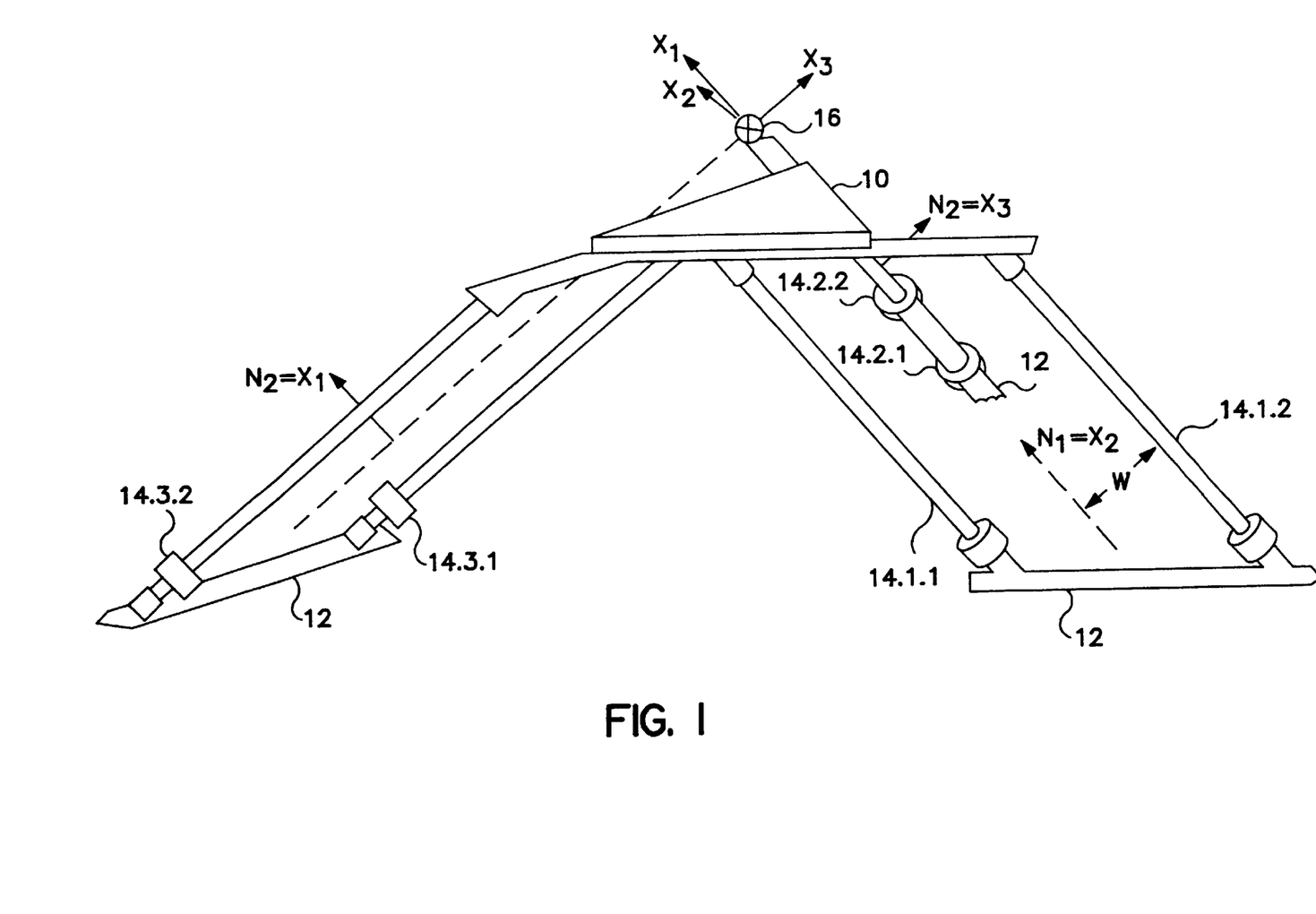
FIG. 1 is an isometric view of a kinematic vibration isolation mount having six independently controllable degrees of freedom, constructed using six axial isolator struts in accordance with the present invention.

FIG. 1 illustrates, in accordance with one preferred embodiment of the invention, a configuration for isolation of a payload or equipment platform, indicated by reference numeral 10, from vibration of a base platform 12. The payload platform 10 carries precision equipment (not shown), such as an optical telescope that must be accurately maintained in alignment in a desired direction in three-dimensional space. The vibration isolation and positioning mount of the invention further includes three pairs of semi-active isolators, referred to generally by reference numeral 14, and more specifically by reference numerals 14.1, 14.2 and 14.3, respectively, for the first, second and third pairs of isolators. The individual isolators in each pair are designated by suffixes 0.1 and 0.2. For example, the first pair of isolators 14.1 are referred to by reference numerals 14.1.1 and 14.1.2. Each semi-active isolator 14 is pivotally mounted by one of its ends to the base platform 12 and by its other end to the equipment platform 10. Further, the isolators 14 in each pair are positioned in a parallel relationship with each other, lying in the same plane, such that a centerline parallel to and midway between the two isolators of each pair passes through the center of mass of the equipment platform and its payload. This center of mass is indicated at 16 in FIG. 1.

Another geometric property of the illustrative configuration is that each plane in which a pair of the isolators 14 lie is orthogonal to the other two planes. That is to say, the planes in which the pairs of isolators are positioned are mutually orthogonal. Since all three planes pass through the center of mass 16, the planes may be considered as corresponding to three faces of a cube, with the center of mass being positioned at a corner of the cube. Before describing the useful and unusual properties of this configuration, the structure of each of the isolators 14 will be briefly described with reference to FIGS. 2 and 3.

Figure 2:
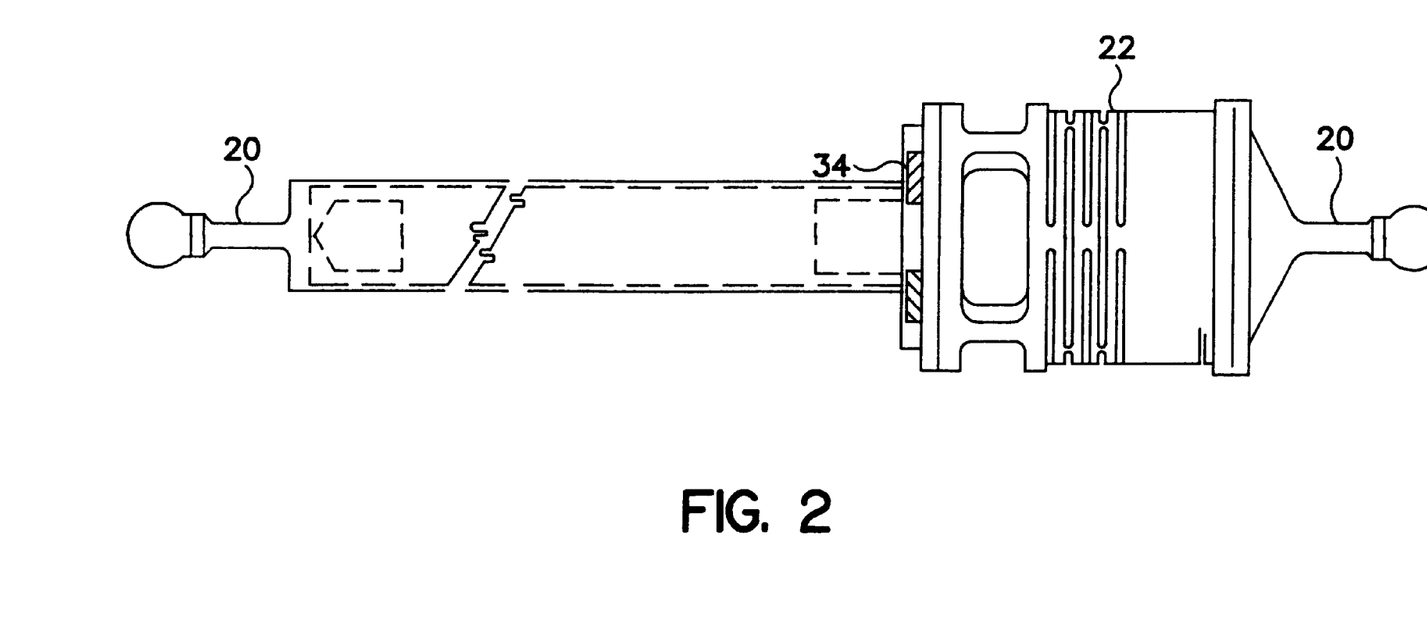
FIG. 2 is a simplified elevational view of a semi-active axial isolator strut in accordance with the invention emphasizing its passive components.
Figure 3:
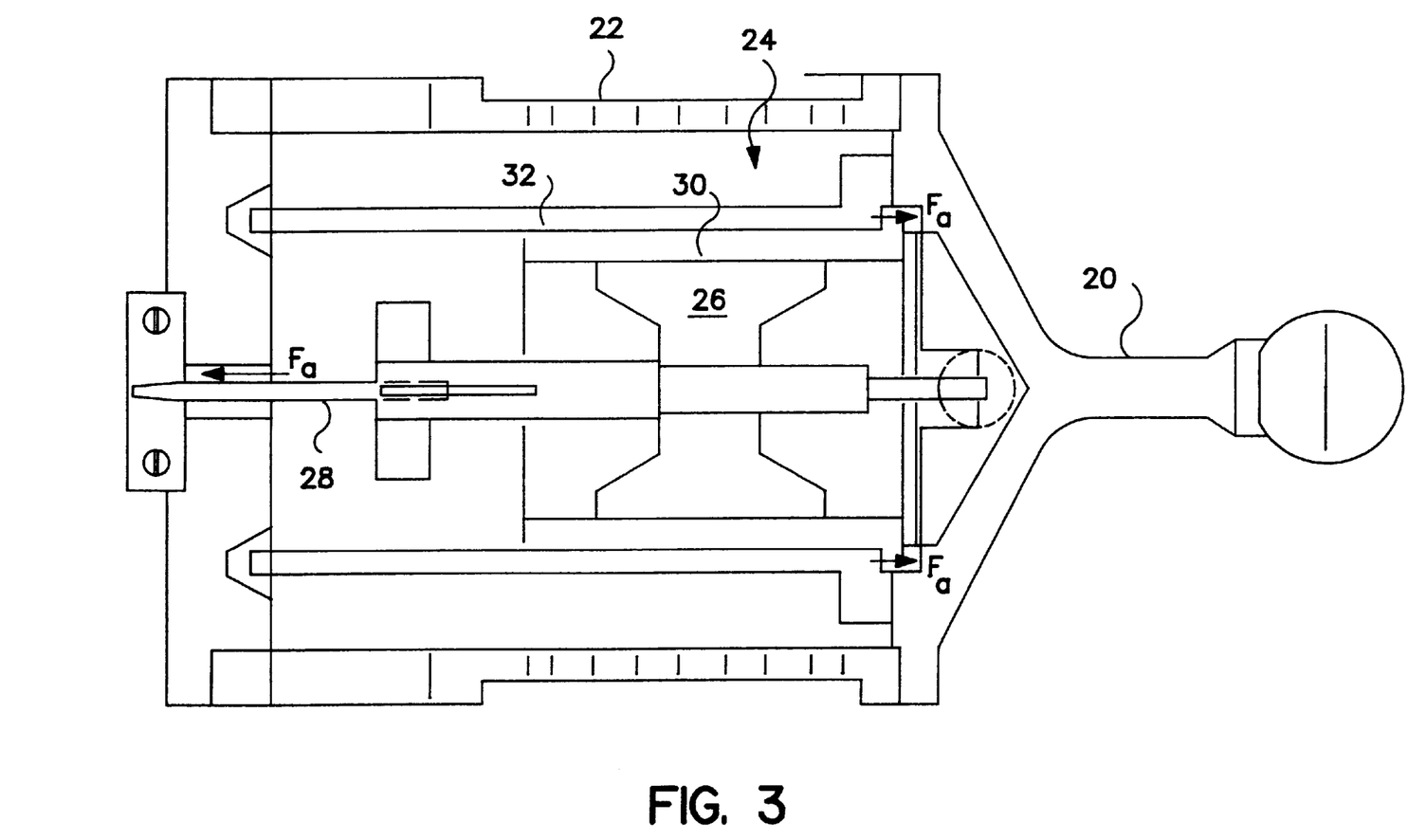
FIG. 3 is a cross-sectional view of a spring-actuator element of the isolator strut of FIG. 2, showing passive and active components.

Each isolator strut 14, as shown in FIG. 2, includes end flexures 20, which are portions of reduced cross section to allow a limited amount of bending. The flexures 20 minimize lateral and bending loads on the isolator struts 14. Each isolator strut 14 provides a known compliance in the axial direction. Compliance is a measure of the relationship between the axial deflection provided by the strut in the presence of an axial force. The isolator strut 14 includes a passive spring 22, preferably formed as a slotted cylinder, to provide static positioning and high-frequency isolation. The slotted cylinder forming the spring 22 provides a relatively long stroke (high deflection) with high strength through the use of multiple beam elements (delineated by the slots in the cylinder) acting in series and in parallel. The slotted cylinder also provides high shear and torsional stiffness, keeping the actuator strut 14 in good alignment and minimizing coupling of forces to other axes. The compliance of the passive spring 22 is chosen to provide an acceptable range of passive isolation frequencies. The selection of spring compliance takes into consideration the mass, center of gravity and inertia properties of the payload mounted on the payload platform 10.

If one has the complete freedom to locate and orient the isolator struts 14, it is possible to achieve nearly identical passive isolation frequencies in all six degrees of freedom. Even with constraints on location and orientation, it is typically possible to cluster these isolation frequencies to be within a one-octave frequency span. The passive spring 22 provides "dc positioning," i.e. provides the spring strength to achieve a desired payload position in the absence of vibration, and provides very high frequency isolation, as will be further discussed below.

Another principal component of each isolator strut 14 is an active damping component acting in parallel with the passive spring 22. The active component in the presently preferred embodiment of the invention is a voice coil actuator 24, best shown in FIG. 3. The voice coil actuator includes a permanent magnet 26 rigidly coupled to a force transmission rod 28 that is connected to one end of the spring 22, and a coil of wire 30 surrounding the magnet and wound on a bobbin 32 that is connected to the other end of the spring 22. For convenience, the coil 30 and the magnet 26 are located within the slotted cylinder that forms the spring 22. When an electric current is applied to the coil 30, interaction of the magnetic fields of the coil and the magnet 26 results in an axial force tending to move the coil with respect to the magnet and, therefore, tending to either compress or stretch the spring 22, depending on the direction of the current in the coil. Thus the spring 22 and the voice coil actuator 24 act in parallel and in an axial sense along the isolator strut 14.

The actuator 24 performs as many as three separate functions: (a) actively damping oscillation caused by the fundamental resonance of the isolator, particularly the passive spring 22; (b) actively attenuating forces transmitted through the passive spring to the payload platform 10; and (c) actively canceling forces applied directly to the payload. The voice coil actuator 24 has excellent stroke characteristics and does not add stiffness to the isolator. The voice coil actuator provides an output force that is proportional to the input current at frequencies from zero to the kilohertz region.

For the control of the actuator 24 in its active damping functions, the internal force developed within the isolator strut 14 is sensed and used to generate an appropriate compensating actuator force. Various types of sensors can be used for this purpose. One category of such sensors is gap sensing devices of various types, which measure the spring gap 22 or the distance between the payload platform 10 and the base platform 12. Possible embodiments include capacitive sensors, linear variable displacement transformers (LVDTs), and inductive eddy current probes. In the presently preferred embodiment of the invention, each of the isolator struts 14 includes an in-line force transducer 34 (FIG. 2), such as a quartz or piezoceramic load cell, or a piezoceramic wafer bonded to the axial strut supporting the payload. This provides an instantaneous measure of the internal force in the strut 14.

As can be observed from FIG. 1, each pair of isolators 14 addresses motion in the translational direction, $X_i$, along their common line of action and in the rotational direction, $2_{\theta i}$, about an axis $n_i$ normal to their common plane. Thus, the three pairs of isolators 14.1, 14.2 and 14.3 together function semi-actively to minimize translational vibration in all three axes. When supplying translational force, each pair of isolators acts in unison, with each member of the pair supplying an equal contribution to the isolation effect.

The sum of the stiffnesses, $K_i$, of the two isolator elements 14 in a pair defines the total stiffness, $K_{Xi}=2K_i$, in their assigned translational direction, $X_i$. The sum of the stiffnesses of the two isolator elements 14 in a pair times the square of the distance, $W_i$, to their common centerline defines the total rotational stiffness, $K_{\theta i}=2K_i W_i^2$, about their assigned normal direction, $n_i$. Since the three pairs of isolator elements 14 are disposed in orthogonal planes, the isolation frequencies in each of the three translational isolation modes and in each of the three rotational isolation modes can be assigned independently by adjusting the three elemental stiffness, $K_i$, and the three centerline separation distances, $W_i$. Thus one can assign isolation frequencies for rotational vibrations at a much lower value than for translational vibrations, for instance employing a 1 Hz rotational isolator and a 5 Hz translational isolator. One would accomplish this by making the centerline separation distance, $W_i$, five times smaller than the radius of gyration, $D_I$, of the payload's mass moment of inertia about the normal axis, $n_i$. Thus one can design an isolation mount with physically achievable strength and stiffness for translational motions for operations in a gravity field, while at the same time providing an extremely compliant rotational isolator to greatly reduce the transmission of vibratory motions that adversely affect pointing.

Similarly, one can command small translational and rotational motions in a simple manner due to the decoupling between motions in the orthogonal planes. Translations along the line of action of a pair of isolator elements 14 can be commanded by providing identical commands to both force actuators in the pair, e.g, to the actuators in isolators 14.1. Rotations about the normal to their common plane can be commanded by providing a differential command to the force actuators in the pair. The effect of rotational commands can be amplified by making the separation between isolator elements 14 small. For a force, $F_I$, commanded differentially to the $i^{th}$ pair of isolator elements, the rotation about the normal to the pair of isolator elements is $\theta_i = \delta_i / W_i = (F/K_i)/$ $W_i$. In the same manner that close spacing of the isolator elements 14 enhances the rotational isolation effect, so also does it enhance the rotational stroke of the pointing system for a given translational stroke, $*/_{max}\delta_{max}$.

Perhaps the most beneficial aspect of this variant of the invention is to decouple in transmission of base translational motions between translation and rotation. This decoupling arises since the common line of action of each of the pairs of isolator elements 14 passes through the payload center of mass 16. Thus, a relative translation in any direction between the base and payload platforms 12 and 10, respectively, will cause force through the payload center of mass 16, but no turning moments about the mass center. Therefore, translational vibratory motions in the base platform 12 will not induce pointing errors in the payload platform 10.

Figure 4:
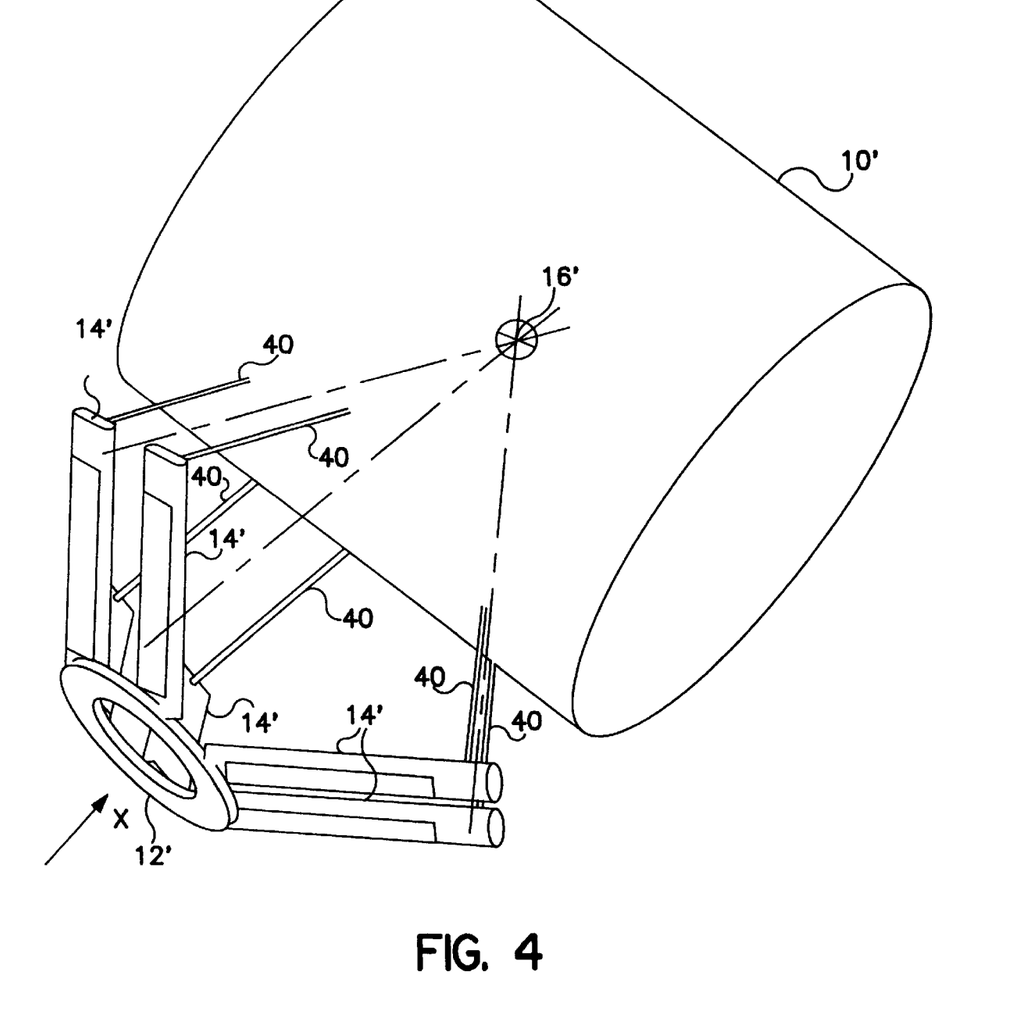
FIG. 4 is an isometric view of a kinematic vibration isolation mount having six degrees of freedom (five of which are independently controllable) constructed using six beam flexure struts in a variant of the present invention.

FIG. 4 depicts another embodiment of the invention, with a base platform 12' and a payload platform 10' having a center of mass 16'. The configuration also includes three pairs of isolators 14'. Each of the isolators 14' is coupled to the payload platform 10' through a flexure 40 that transmits force along only one axis, referred to as the z axis in FIGS. 5A and 5B. The three pairs of isolators 14' in this configuration function in a similar fashion to the isolators 14 in the configuration of FIG. 1. The flexures 40 in each pair of isolators are aligned in a parallel relationship with each other, and the centerline midway between them passes through the center of mass 16'. Further, the planes in which the pairs of flexures 40 lie are mutually orthogonal.

Figure 5A:
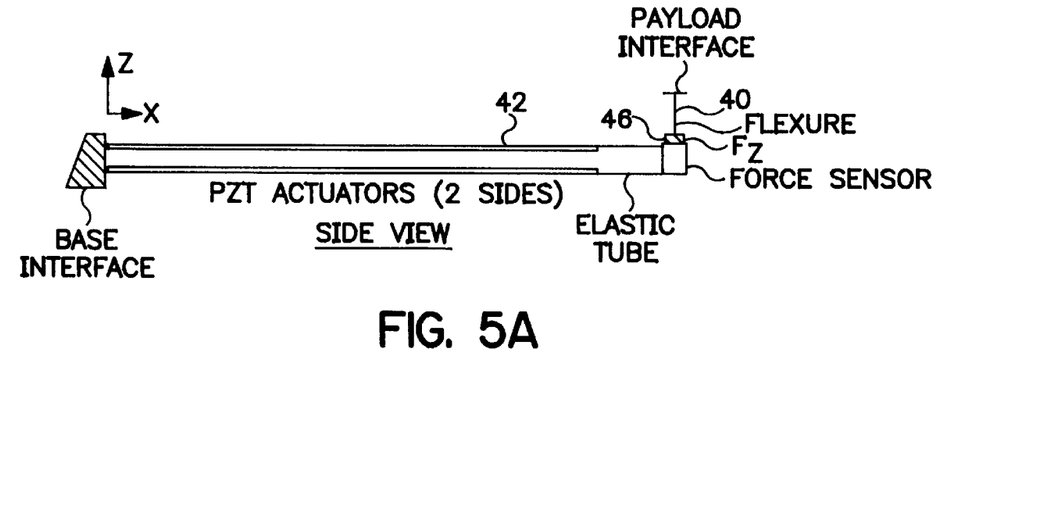
FIG. 5A is an elevational view of a flexure-actuator element of one of the isolators in the configuration of FIG. 4.
Figure 5B:
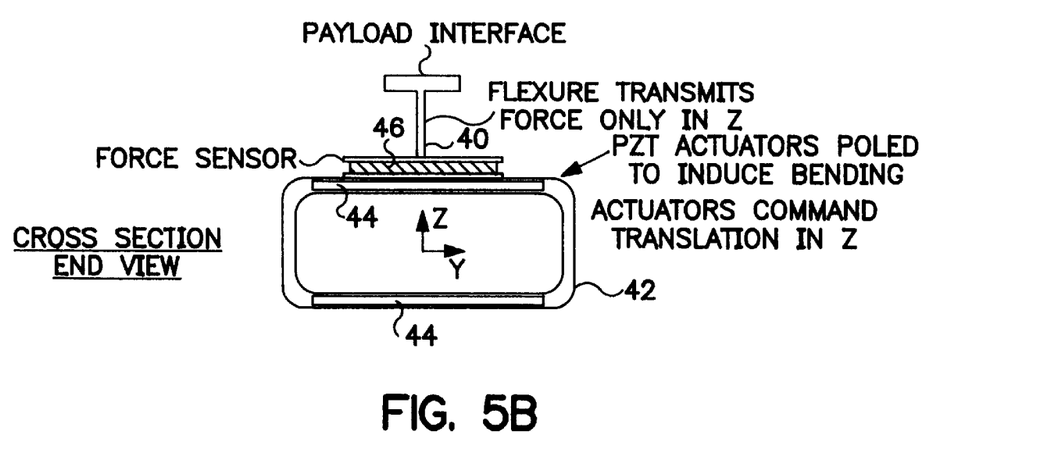
FIG. 5B is an enlarged cross-sectional view of the flexure-actuator element of FIG. 5A, taken substantially along the line 5B—5B and showing passive and active components.

A flexure-actuator element of one of the isolators 14' is shown in more detail in FIGS. 5A and 5B. It consists of an elastic tube 42 having a longitudinal axis aligned with the x-axis direction and having integral PZT actuators 44 on opposite sides of the tube, the actuators being poled to induce bending of the tube when the actuators are energized with appropriate electrical signals. The bending movement is such that the tube is deflected in the x-z plane, where the z axis is the direction of alignment of the flexure 40. At the end of the tube 42 remote from the base platform 12', the flexure 40 is attached to the tube through a force sensor 46. When the tube is bent by application of electrical control signals to the actuators 44, force is transmitted to the payload platform 10' through the flexure 40, which is aligned with the z axis of the isolator 14', and the amount of the force applied through the flexure is measured by the force sensor 46.

Figure 6:
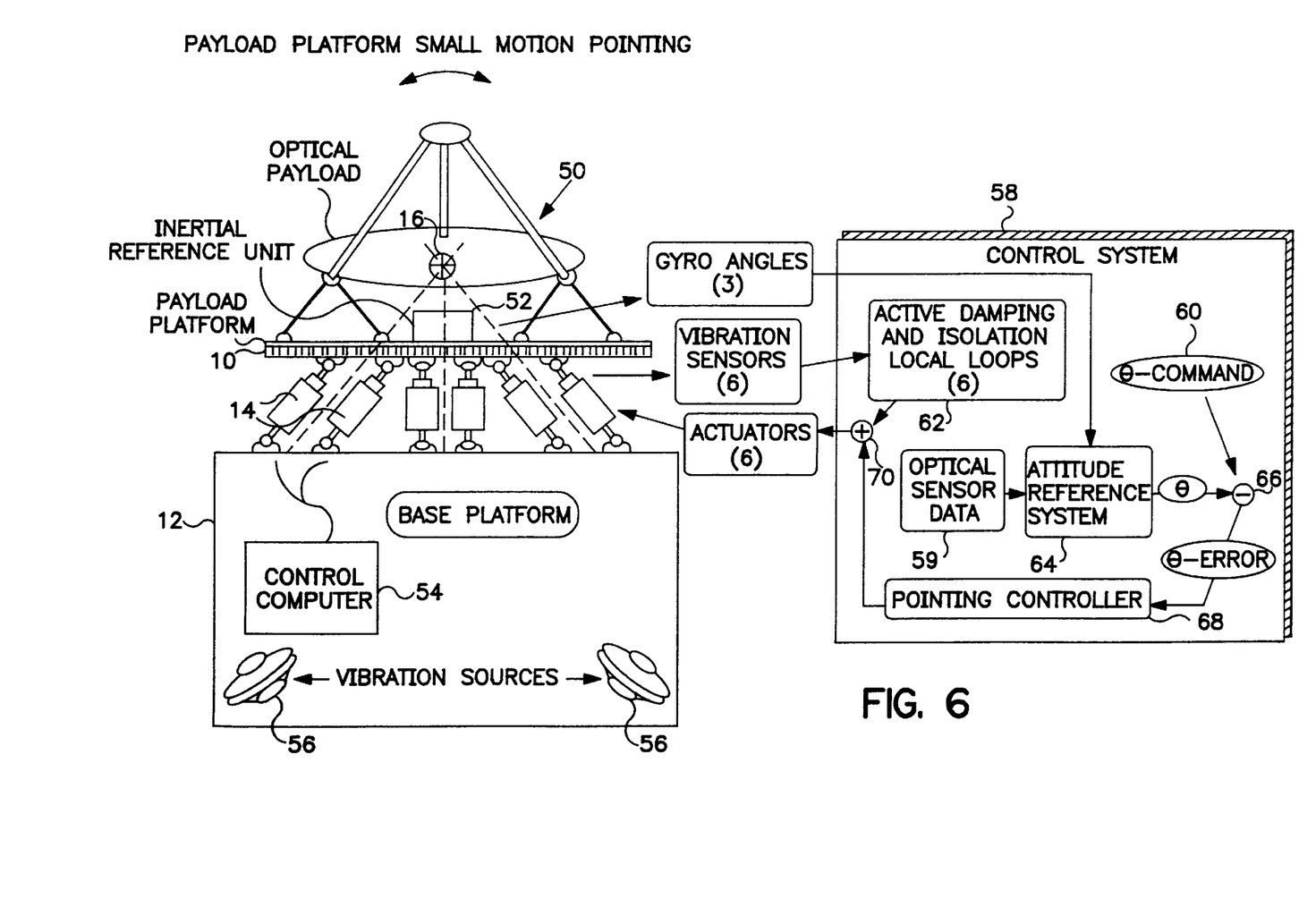
FIG. 6 is a block diagram showing the isolator struts in relation to the base and payload platforms, and also showing how the isolator struts are coupled to a control system.

FIG. 6 shows a complete precision payload vibration isolation and pointing system employing the principles of the present invention. The payload platform 10 is shown as supporting a precision optical payload, indicated at 50, and the figure further shows an inertial reference unit 52, and a control computer 54 installed in the base platform 12. The base platform 12 is, of course, subject to vibration from various sources, indicated at 56.

On the right-hand side of FIG. 6, a control system 58 is shown. It will be understood that the control system 58 may be implemented in various forms and that what is shown is for purposes of illustration only. Ideally, the control system 58 is implemented in software form in the control computer 54. The control system 58 receives input data from four sources: (a) the actual payload platform angular position data provided as three angular rates from the inertial reference unit 52, (b) optical sensor data 59 indicative of the pointing angle of the optical payload 50, (c) sensed vibration data from the force transducers 34 (FIG. 2) or 46 (FIGS. 5A and 5B) in the six isolators 14, and (d) an angular pointing command, indicated at 60 in FIG. 6. The control system generates output signals to the six actuators 24 (FIG. 3) or 44 (FIGS. 5A and 5B).

The control system 58 includes six damping and isolation control loops, indicated at 62, which compute actuator signals based on the measured vibration forces. The inertial data indicative of the payload platform position and the optical sensor data 59 are combined in an attitude reference system 64, which computes actual pointing angles 2. The differences between these pointing angles and those provided by the commanded angles 60 are computed in a subtractor circuit 66, and angle error signals are presented to a pointing controller 68, which generates appropriate actuator signals to correct the pointing angle errors. These actuator signals are combined with active damping signals from the damping and isolation loops 62, in an adder circuit 70, and the combined control signals are fed to the actuators 24 (FIG. 3) or 44 (FIGS. 5A and 5B).

Figure 7:
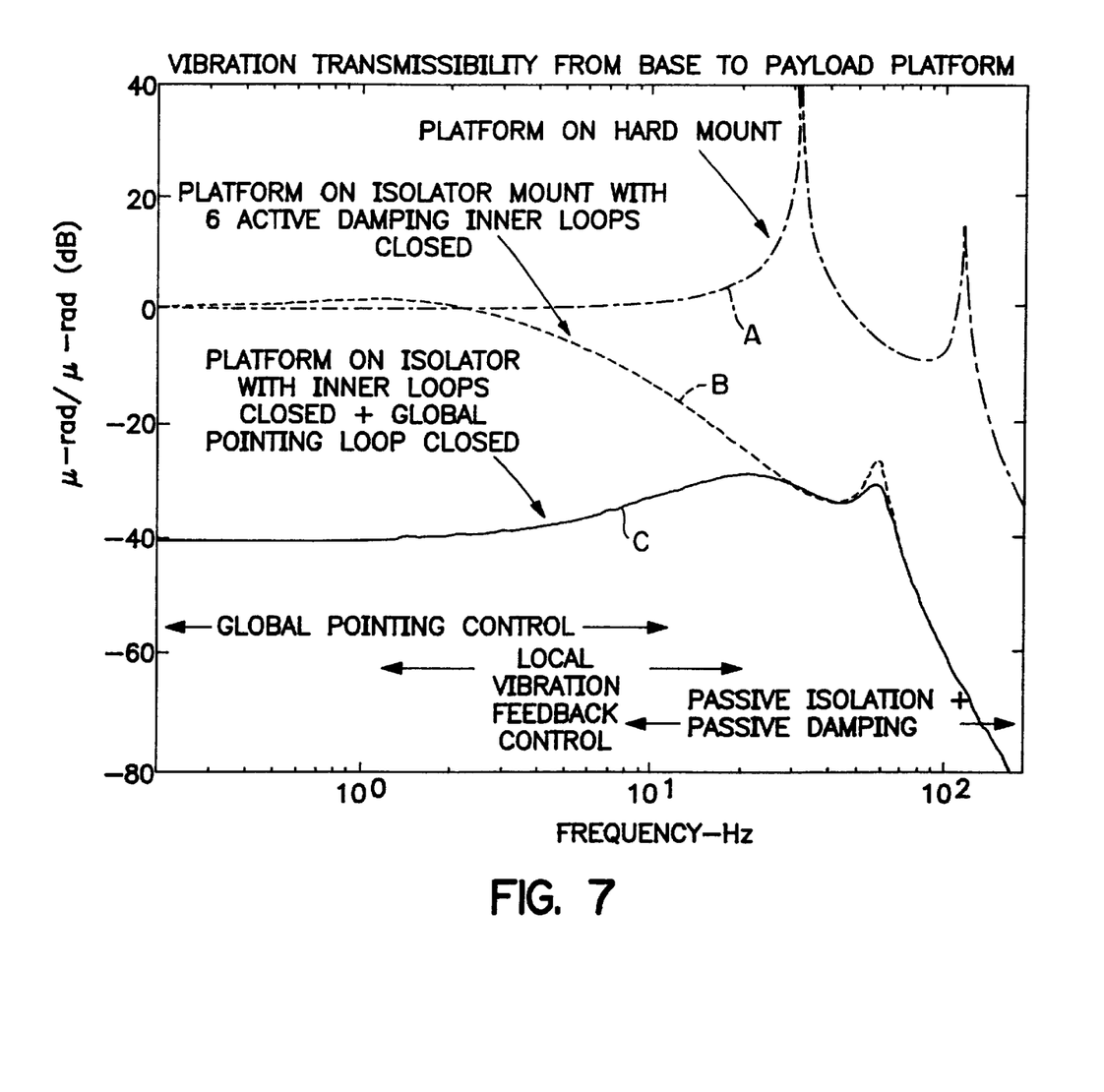
FIG. 7 is a graph showing a performance characteristic of the semiactive isolator/pointing mount for open-loop operation (using passive isolation only), with local damping loops closed (using passive isolation and active isolation), and with the global positioning loop closed (using passive isolation, active isolation and pointing control).

FIG. 7 is a set of graphs depicting the performance of the invention in suppressing transmission of vibration from the base platform 12 to the payload platform 10. Curve A shows the vibration transmissibility with the payload platform connected to the base platform by a hard mount, i.e., with no damping of vibration. The vertical scale represents a vibration power ratio, measured in dB (decibels), of the vibration of the payload platform 10 compared with vibration of the base platform 12. The horizontal axis represents the frequency of vibration in Hertz, and extends from less than 1 Hz to over 100 Hz. It will be observed from curve A that the transmissibility stays at 0 dB up to about 10 Hz. The 0 dB level indicates a power ratio of one in absolute terms, i.e., the payload platform 10 vibrates with the base platform 12. Above 10 Hz, there two upward spikes in the transmissibility curve (A), indicating the occurrence of resonance conditions that cause the payload platform to vibrate even more that the base platform.

Curve B shows the improvement obtained when the payload is placed on an isolation mount and the six damping control loops are closed and operational. As indicated along the frequency axis, local vibration feedback control is effective over a frequency range from approximately 2 Hz to approximately 10.5 Hz, and passive isolation and damping is effective above a frequency of approximately 10 Hz. As curve B shows, the local feedback control loops provide an increasing improvement, up to about −20 dB at 10 Hz. Passive isolation and damping provides even greater levels of damping as the frequency of vibration increases.

The most dramatic vibration performance improvement is found when the pointing control loop is closed, as indicated in curve C. The global pointing control loop is effective at very low frequencies, from near zero up to about 5 Hz. Improvement of approximately −40 dB is obtained over this range. Curve C (with pointing control) continues to provide an improvement over curve B (no pointing control) until about 11 Hz and above, at which point the two curves merge and passive damping is the predominant effect.

It will be appreciated from the foregoing that the present invention represents a significant improvement in the field of vibration isolation mounting systems. In particular, the invention provides a combination of passive isolation at relatively high frequencies, active isolation at lower frequencies at which passive isolation is ineffective, and fine pointing control at very low frequencies at which neither active nor passive isolation is effective. Another important aspect of the invention is that a specific configuration of isolators effectively decouples the transmission of translational vibration into payload angular rotation. It will also be appreciated that, although several embodiments of the invention have been described in detail for purposes of illustration, various modifications may be made without departing from the spirit and scope of the invention. Accordingly, the invention should not be limited except as by the appended claims.

What is claimed is:

1. A semi-active vibration isolator, comprising:
   a plurality of isolator devices connected between a first platform and a second platform which is to be isolated with respect to the first platform, wherein each of the isolator devices includes
      a passive isolator element having a first end connected to the first platform and a second end connected to the second platform, wherein the passive isolator element reduces the effect of vibratory disturbances over a limited band of frequencies,
      an active isolator element connected to operate in parallel with the passive isolator element, between the first and second platforms, the active isolator element having a first end connected to the first end of the passive isolator element and a second end connected to the second end of the passive isolator element, the active isolator element functioning to compensate for vibratory disturbances over a selected frequency band complementing the effect of the passive isolator element, and
      a sensor attached to the isolator device for sensing internal strain or stress in the isolator due to vibratory disturbances;
   a damping control circuit responsive to signals from the sensor, for generating signals to control the active isolator element in such a manner as to compensate for the vibratory disturbances; and
   an angular positioning control circuit, for generating actuator control signals to correct angular positioning errors in the second platform.

2. A semi-active vibration isolator as defined in claim 1, wherein:
   the vibratory disturbances occur primarily in the first platform and are reduced in the second platform.

3. A semi-active vibration isolator as defined in claim 2, wherein:
   the passive isolator element is a spring providing support of static load on the second platform and providing vibration isolation at relatively high frequencies; and
   the active isolator element is a voice coil actuator providing damping of resonant vibration of the spring and vibration isolation at lower frequencies.

4. A semi-active vibration isolator as defined in claim 3, wherein:
   the passive isolator element provides vibration isolation at frequencies above approximately 10 Hz; and
   the active isolation element provides vibration isolation at frequencies below approximately 10 Hz and down to approximately 1 Hz.

5. A semi-active vibration isolation system and fine positioning mount, comprising:
   a base platform subject to vibrational disturbances;
   a payload platform carrying a precision payload to be isolated from the vibrational disturbances and angularly positioned as desired;
   at least three pairs of isolator-actuators connected between the base platform and the payload platform, each isolator-actuator including a force sensor, a passive isolator element having a first end connected to the base platform and a second end connected to the payload platform, and an actuator connected to operate in parallel with the passive isolator element, between the base platform and the payload platform, the actuator having first and second ends connected to the respective first and second ends of the passive isolator element;
   angular position sensors for generating signals indicative of the angular position of the payload platform; and
   a control system for generating actuator control signals in response to sensed vibrations and in response to differences between commanded position signals and the signals indicative of the angular position of the payload platform;
   wherein each isolator-actuator provides a parallel and complementary combination of active damping and passive damping, whereby fine positioning precision is maintained even in the presence of low-frequency vibration of the base platform.

6. A semi-active vibration isolation system and fine positioning mount as defined in claim 5, wherein:
   the payload platform and payload have a center of mass;
   each pair of isolator-actuators has a centerline passing through the center of mass; and
   translational vibration transmitted through the pairs of isolator-actuators is not converted into rotation of the payload because the vibrational forces are all applied at the center of mass.

7. A semi-active vibration isolation system and fine positioning mount as defined in claim 6, wherein:
   there are three pairs of isolator-actuators; and
   each pair of isolator-actuators lies in a plane and the planes of the three pairs of isolator-actuators are mutually orthogonal.

8. A method for isolating a payload platform from vibration, comprising the steps of:
   connecting three pairs of vibration isolators between the payload platform and a base platform subject to vibration, each vibration isolator having an active isolation element with a first end connected to the payload platform and a second end connected to the base platform, and having a passive isolation element also with a first end connected to the payload platform and a second end connected to the base platform, wherein each passive isolation element operates in parallel with an active isolation element;
   passively isolating the payload platform by using the passive isolation elements to provide isolation over a relatively high band of frequencies;
   actively isolating the payload platform by using the active isolation elements to provide isolation over a relatively low band of frequencies complementing those over which the step of passively isolating is effective; and
   actively positioning the payload platform to correct differences between desired position angles and sensed position angles;
   whereby the last-recited step of actively positioning the payload platform also isolates the payload platform from vibration at very low frequencies.

9. A method as defined in claim 8, wherein the step of actively isolating the payload platform includes:
   actuating each pair of isolators in unison to compensate for translational vibration; and actuating the isolators in each pair independently to compensate for rotational vibration.

10. A method as defined in claim 9, and further comprising the steps of:
   selecting an elemental stiffness of the isolators to provide a desired isolation frequency range for control of translational vibration; and
   assigning the spacing between each pair of isolators to provide a desired isolation frequency range for control of rotational vibration.

11. A method as defined in claim 8, wherein the step of actively isolating includes:
   sensing internal stress or strain in the vibration isolator;
   deriving a compensating control signal from the sensed internal stress or strain in the vibration isolator; and
   applying the compensating control signal to an actuator attached to the vibration isolator, wherein the compensating control signal results in damping of vibrations in the payload platform.

12. A method as defined in claim 11, and further comprising the steps of:
   sensing velocity or acceleration of the payload platform caused by disturbances applied directly to the payload platform;
   deriving another compensating signal from the sensed velocity or acceleration signals; and
   applying the other compensating signal to the actuator, to reduce the effect of vibrational disturbances applied directly to the payload platform.

* * * * *